United States Patent [19]

Conrow et al.

[11] 4,061,627
[45] Dec. 6, 1977

[54] BIS-SUBSTITUTED NAPHTHALENE-AZO PHENYLENEAZO-STILBENE-DISULFONIC AND NAPHTHALENE-SULFONIC ACID

[75] Inventors: Ransom Brown Conrow, Pearl River; Seymour Bernstein, New City; Norman Bauman, Nanuet, all of N.Y.

[73] Assignee: American Cyanamid Company, Stamford, Conn.

[21] Appl. No.: 612,169

[22] Filed: Sept. 10, 1975

[51] Int. Cl.$^2$ .................. C07C 107/06; C07C 107/08; C09B 35/02; C09B 35/22

[52] U.S. Cl. ..................... 260/178; 260/152; 260/153; 260/174; 260/175; 260/184; 260/186; 260/187; 260/198; 424/226

[58] Field of Search ............. 260/174, 178, 184, 186

[56] References Cited

U.S. PATENT DOCUMENTS

| | | | |
|---|---|---|---|
| 2,211,752 | 8/1940 | Kappeler | 260/152 |
| 3,502,644 | 3/1970 | Nickel et al. | 260/154 |
| 3,558,592 | 1/1971 | De Montmollin | 260/199 |

FOREIGN PATENT DOCUMENTS

| | | | |
|---|---|---|---|
| A10,259 | 3/1909 | France | 260/178 |
| 177,178 | 10/1905 | Germany | 260/178 |
| 2,150,823 | 6/1972 | Germany | 260/199 |
| 558,219 | 12/1943 | United Kingdom | 260/178 |

OTHER PUBLICATIONS

Gordon et al., Chemical Abstracts, vol. 40, 2217$^9$ (1946).
Gordon et al. (II), J. Path. Bact., vol. 57, pp. 451 to 456 (1945).
Biochemische Zeitschrift, CXLIX, pp. 331 to 338 (1924).
Okubo et al., Chemical Abstracts, vol. 48, 10646 to 10647 (1954).
Lambert et al., Chemical Abstracts, vol. 46, 11393e (1952).
Colour Index, 3rd Edition, vol. 4, p. 4181, No. 22850, p. 4213 Nos. 24870, 24875 and 24880; and p. 4221, Nos. 25375, 25380 and 25400 (1971).

*Primary Examiner*—Floyd D. Higel
*Attorney, Agent, or Firm*—Jack W. Richards

[57] ABSTRACT

Bis-substituted naphthylazo - and phenyleneazo - stilbenedisulfonic and naphthalenesulfonic acid salts useful as complement inhibitors.

3 Claims, No Drawings

BIS-SUBSTITUTED NAPHTHALENE-AZO PHENYLENEAZO-STILBENE-DISULFONIC AND NAPHTHALENE-SULFONIC ACID

BACKGROUND OF THE INVENTION

The present invention resides in the concept of certain substituted bisnaphthylazo sulfonic acids and salts and their use as inhibitors of the complement system of warmblooded animals.

The term "complement" refers to a complex group of proteins in body fluids that, working together with antibodies or other factors, play an important role as mediators of immune, allergic, immunochemical and/or immunopathological reactions. The reactions in which complement participates takes place in blood serum or in other body fluids, and hence are considered to be humoral reactions.

With regard to human blood, there are at present more than 11 proteins in the complement system. These complement proteins are designated by the letter C and by number: C1, C2, C3 and so on up to C9. The complement protein C1 is actually an assembly of subunits designated C1q, C1r and C1s. The numbers assigned to the complement proteins reflect the sequence in which they become active, with the exception of complement protein C4, which reacts after C1 and before C2. The numerical assignments for the proteins in the complement system were made before the reaction sequence was fully understood. A more detailed discussion of the complement system and its role in body processes can be found in, for example, *Bull. World Health Org.*, 39 935-938 (1968); *Scientific American*, 229, (No. 5), 54-66 (1973); *Medical World News*, Oct. 11, 1974, pp. 53-58; 64-66; *Harvey Lecturers*, 66, 75-104 (1972); *The New England Journal of Medicine*, 287, 489-495; 545-549; 592-596; 642-646 (1972); *The John Hopkins Med. J.* 128, 57-74 (1971); and *Federation Proceedings*, 32, 134-137 (1973).

The complement system can be considered to consist of three sub-systems: (1) a recognition unit (C1q) which enables it to combine with antibody molecules that have detected a foreign invader; (2) an activation unit (C1r, C1s, C2, C4, C3), which prepares a site on the neighboring membrane; and (3) an attack unit (C5, C6, C7, C8 and C9) which creates a "hole" in the membrane. The membrane attack unit is non-specific; it destroys invaders only because it is generated in their neighborhood. In order to minimize damage to the host's own cells, its activity must be limited in time. This limitation is accomplished partly by the spontaneous decay of activated complement and partly by interference by inhibitors and destructive enzymes. The control of complement, however, is not perfect, and there are times when damage is done to the host's cells. Immunity is therefore a double-edged sword.

Activation of the complement system also accelerates blood clotting. This action comes about by way of the complement-mediated release of a clotting factor from platelets. The biologically active complement fragments and complexes can become involved in reactions that damage the host's cells, and these pathogenic reactions can result in the development of immune-complex diseases. For example, in some forms of nephritis complement damages the basal membrane of the kidney, resulting in the escape of protein from the blood into the urine. The disease disseminated lupus erythematosus belongs in this category; its symptoms include nephritis, visceral lesions and skin eruptions. The treatment of diphtheria or tetanus with the injection of large amounts of antitoxin sometimes results in serum sickness, an immune-complex disease. Rheumatoid arthritis also involves immune complexes. Like disseminated lupus erythematosus, it is an autoimmune disease, in which the disease symptoms are caused by pathological effects of the immune system in the host's tissues. In summary, the complement system has been shown to be involved with inflamation, coagulation, fibrinolysis, antibody-antigen reactions and other metabolic processes.

In the presence of antibody-antigen complexes the complement proteins are involved in a series of reactions which may lead to irreversible membrane damage if they occur in the vicinity of biological membranes. Thus, while complement constitutes a part of the body's defense mechanism against infection, it also results in inflammation and tissue damage in the immunopathological process. The nature of certain of the complement proteins, suggestions regarding the mode of complement binding to biological membranes and the manner in which complement effects membrane damage are discussed in *Annual Review in Biochemistry*, 38, 389 (1969).

A variety of substances have been disclosed as inhibiting the complement system, i.e., as complement inhibitors. For example, the compounds 3,3'-ureylenebis-[6-(2-amino-8-hydroxy-6-sulfo-1-naphthylazo)]benzenesulfonic acid tetrasodium salt (chlorazol fast pink), heparin and a sulphated dextran have been reported to have an anticomplementary effect, *British Journal of Experimental Pathology*, 33, 327-339 (1952). The compound 8-(3-benzamido-4-methylbenzamido)naphthalene-1,3,5,-trisulfonic acid (Suramin) is described as a competitive inhibitor of the complement system, *Clin. Exp. Immunol.*, 10, 127-138 (1972). German Pat. No. 2,254,893 or South African Pat. No. 727,923 discloses certain 1-(diphenylmethyl)-4-(3-phenylallyl)piperazines useful as complement inhibitors. Other chemical compounds having complement inhibiting activity are disclosed in, for example, *Journal of Medicinal Chemistry*, 12, 415-419; 902-905; 1049-1052; 1053-1056 (1969); *Canadian Journal of Biochemistry*, 47, 547-552 (1969); *The Journal of Immunology*, 93, 629-640 (1964); *The Journal of Immunology*, 104, 279-288 (1970); *The Journal of Immunology*, 106, 241-245 (1971); and *The Journal of Immunology*, 111, 1061-1066 (1973).

It has been reported that the known complement inhibitors epsilon-aminocaproic acid, Suramin and tranexamic acid all have been used with success in the treatment of hereditary angioneurotic edema, a disease state resulting from an inherited deficiency or lack of function of the serum inhibitor of the activated first component of complement (C1 inhibitor), *The New England Journal of Medicine*, 286, 808-812 (1972); *Allergol. Et. Immunopath, II,* 163-168 (1974); and *J. Allergy Clin. Immunol.*, 53, No. 5, 298-302 (1974).

SUMMARY OF THE INVENTION

It has now been discovered that certain substituted bisnaphthylazo sulfonic compounds interact with the complement reaction sequence, thereby inhibiting complement activity in body fluids.

This invention is particularly concerned with bis[(-amino-or hydroxyamino-naphthylazo)] sulfonic acids and salts having complement inhibiting activity of the general formula (I):

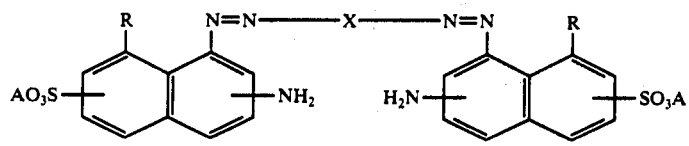

wherein R is H or OH, A is H, Na or K and X is

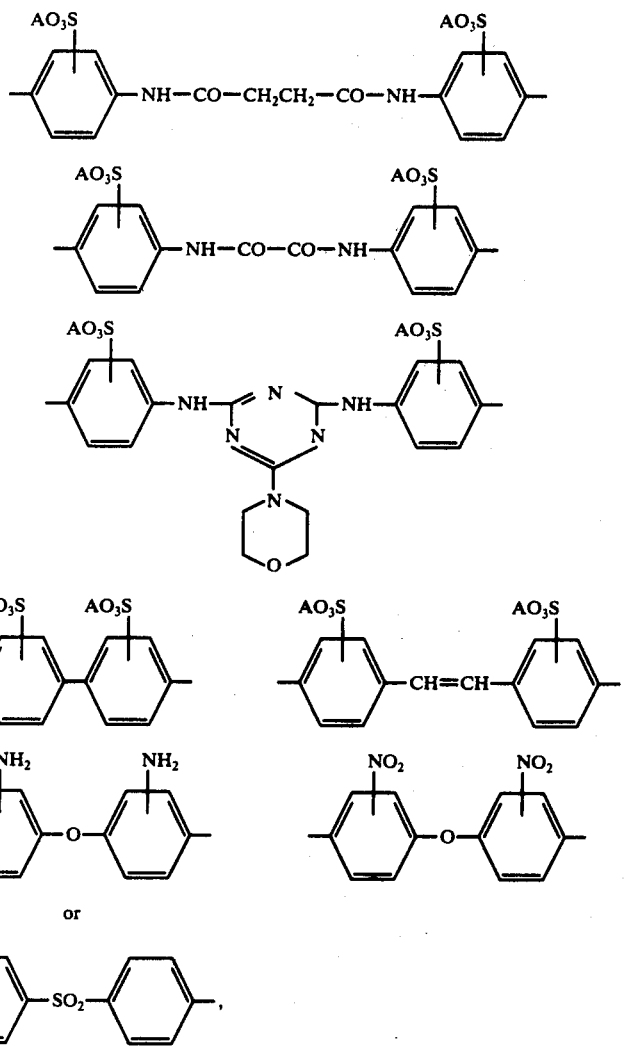

with the proviso that each R and A are the same in the same compound.

Of particular interest in the above general formula (I) are the group of compounds wherein A is Na (sodium) and, within this group, those compounds of most interest are the bis-(2-amino-6-sulfo-1-naphthylazo)-and bis-2-amino-8-hydroxy-6-sulfo-1-naphthylazo)- substituted sulfonic acid salts of the general formula II:

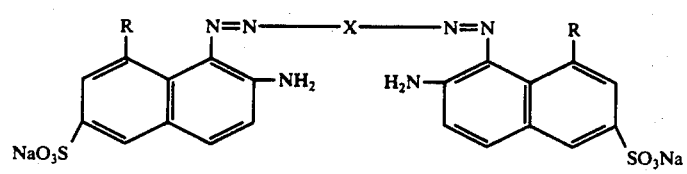

wherein R is H or OH and X is

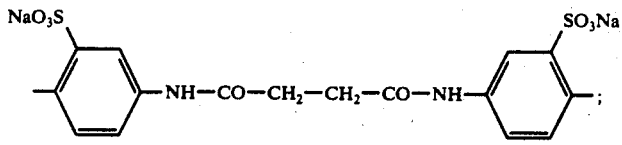

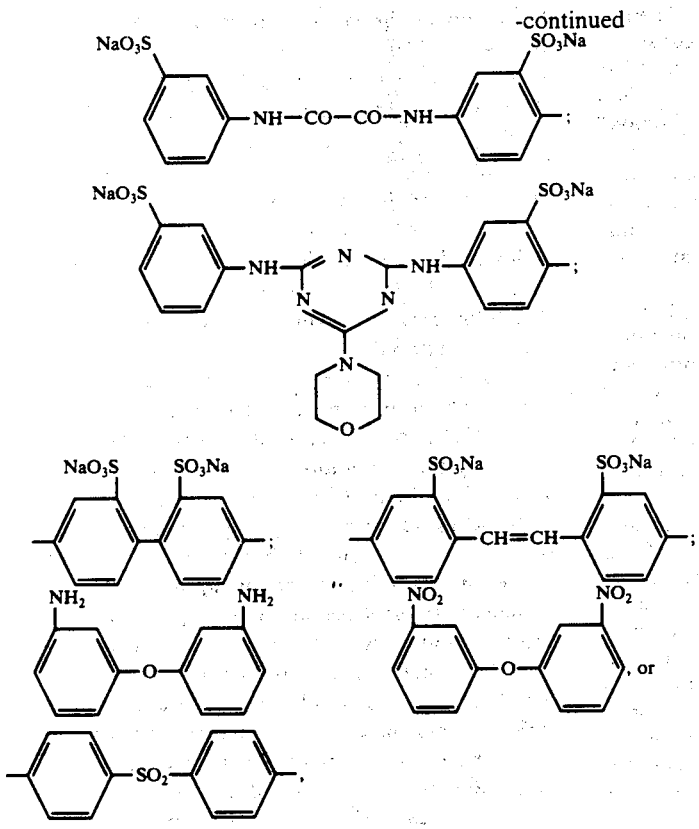

with the proviso that each R is the same in the same compound.

The sulfonic acid salts of this invention can be divided into several groups based on structural similarity to the prior art and the R substituent and/or bridgehead variety (X). Two such groups are Group I, the compounds of Examples 2, 3, 4, 5, 6, 7 and 8; and Group II, the compounds of Examples 1 and 5.

The closest known compound to those of the present invention, and disclosed as having anticomplementary effect, is the compound 3,3'-ureylenebis-[6-(2-amino-8-hydroxy-6-sulfo-1-naphthylazo)]benzenesulfonic acid tetrasodium salt(chlorazol fast pink), British Journal of Experimental Pathology, 33 327–339 (1952).

Representative sulfonic acid salts encompassed within this invention include, for example, 5,5'-(succinyldiimino)bis-[6-(2-amino-8-hydroxy-6-sulfo-1-naphthylazo)-benzenesulfonic acid] tetrasodium salt; 3,3'-(oxalyldiimino)bis-[6-(2-amino-8-hydroxy-6-sulfo-1-naphthylazo)-benzenesulfonic acid] tetrasodium salt; 3,3'-[6-morpholino-s-triazin-2,4-diyl)diimino]bis-[6-(2-amino-8-hydroxy-6-sulfo-1-naphthylazo)-benzenesulfonic acid] tetrasodium salt; 4,4'-bis-(2-amino-8-hydroxy-6-sulfo-1-naphthylazo)-2,2'-biphenyldisulfonic acid tetrasodium salt; 4,4'-bis(2-amino-8-hydroxy-6-sulfon-2-naphthylazo)-2,2'-stilbenedisulfonic acid tetrasodium salt; 5,5'-[oxybis(2-amino-p-phenyleneazo)]-bis-[6-amino-2-naphthalenesulfonic acid] disodium salt; 5,5'-[oxybis(2-nitro-p-phenyleneazo)]bis-[6-amino-2-naphthalenesulfonic acid] disodium salt and 5,5'-[sulfonyl-bis-(p-phenyleneazo)]-bis-[6-amino-4-hydroxy-2-naphthalenesulfonic acid] disodium salt.

Other suitable compounds deemed operable for purposes of this invention, include, 1-naphthylamine-3,6-disulfonic acid; 2-naphthylamine-6,8-disulfonic acid; 2-naphthylamine-4,8-disulfonic acid; 2-naphthylamine-5,7-disulfonic acid; 8-hydroxy-1-naphthylamine-3,6-disulfonic acid; 8-hydroxy-2-naphthylamine-3,6-disulfonic acid; 3-amino-naphthalene-2,6-disulfonic acid; 4-amino-naphthalene-2,6-disulfonic acid; 4,8-diamino-naphthalene-2,6-disulfonic acid; 4-amino-naphthalene-1,3-disulfonic acid; 6-amino-naphthalene-1,3-disulfonic acid; 5,6-diamino-naphthalene-1,3-disulfonic acid; 2-amino-naphthalene-1,5-disulfonic acid; 3-amino-naphthalene-1,5-disulfonic acid; 4-amino-naphthalene-1,5-disulfonic acid; 4-amino-naphthalene-1,6-disulfonic acid; 5-amino-naphthalene-1,6-disulfonic acid; 8-amino-naphthalene-1,6-disulfonic acid; 4-amino-naphthalene-1,7-disulfonic acid; 4-amino-naphthalene-2,6-disulfonic acid; 1-amino-naphthalene-2,7-disulfonic acid; 3-amino-naphthalene-2,7-disulfonic acid; 4-amino-naphthalene-2,7-disulfonic acid; 8-amino-naphthalene-1,3,5-trisulfonic acid; 5-amino-naphthalene-1,3,6-trisulfonic acid; 8-amino-naphthalene-1,3,6-trisulfonic acid; 4-amino-naphthalene-1,3,7-trisulfonic acid; 5-amino-naphthalene-1,3,7-trisulfonic acid; 5-amino-1-oxy-naphthalene-3-sulfonic acid; 6-amino-1-oxy-naphthalene-3-sulfonic acid; 8-amino-1-oxy-naphthalene-3,6-disulfonic acid; 7-amino-naphthalene-1,3,5-trisulfonic acid; 8-amino-naphthalene-1,3,5-trisulfonic acid; 4-amino-naphthalene-1,3,6-trisulfonic acid; and 8-amino-naphthalene-1,3,6-trisulfonic acid.

The compounds of this invention may be prepared as shown by the examples herein, according to the method disclosed in Fundamental Processes of Dye Chemistry, Interscience Publishers, Inc. New York (1949), Chapter II, page 283 and The Chemistry of Synthetic Dyes, Academic Press Inc., New York (1952), Vol. I, Chapter 16, p. 580.

This invention is also concerned with a method of inhibiting the complement system in a body fluid, such as blood serum, which comprises subjecting body fluid complement to the action of an effective complement inhibiting amount of a compound encompassed within formulae (I) and (II) hereinabove. The method of use aspect of this invention is also concerned with a method of inhibiting the complement system in a warm-blooded animal which comprises internally administering to said animal an effective complement inhibiting amount of a compound encompassed within formulae (I) and (II) hereinabove. Body fluid can include blood, plasma, serum, synovial fluid, cerebrospinal fluid, or pathological accumulations of fluid as pleural effusion, etc.

The compounds of the present invention find utility as complement inhibitors in body fluids and as such may be used to ameliorate or prevent those pathological reactions requiring the function of complement and in the therapeutic treatment of warm-blooded animals having immunologic diseases such as rhumuatoid arthritis, systemic lupus erythematosus, certain kinds of glomerulonephritis, certain kinds of auto-allergic hemolytic anemia, certain kinds of platelet disorders and certain kinds of vasculitis. The naphthylazo-sulfonic acids herein may also be used in the therapeutic treatment of warm-blooded animals having non-immunologic diseases such as paroxysmal nocturnal hemoglobinuria, hereditary angioneurotic edema (treated with Suramin, etc.) and inflammatory states induced by the action of bacterial of lysosomal enzymes on the appropriate complement components as for example, as inflammation following coronary occlusion. They may also be useful in the treatment of transplant rejection.

DETAILED DESCRIPTION OF THE INVENTION

The following examples will serve to illustrate the invention in more detail.

EXAMPLE 1

3,3'-(Oxalyldiimino)bis-[6-(2-amino-8-hydroxy-6-sulfo-1-naphthylazo)-benzenesulfonic acid]tetrasodium salt A slightly warm solution of 24.0 g. of 2-amino-5-nitrobenzenesulfonic acid, sodium salt and 6.9 g. of sodium nitrite is prepared in 150 ml. of water. This solution is poured over a stirred mixture of 25 ml. of concentrated hydrochloric acid and 150 g. of ice. A 50 ml. portion of 88% formic acid is added and the mixture is stirred in an ice bath. A solution of the sodium salt of 7-amino-1-naphthol-3-sulfonic acid (gamma acid) is prepared by dissolving 30.5 g. of sodium acetate trihydrate in 100 ml. of water containing 28.1 g. of 85% pure gamma acid and 20 ml. of 5N sodium hydroxide. The resulting solution is poured into the rapidly stirred diazonium salt solution and stirring is continued at room temperature for 15 minutes. The mixture is then warmed to 80° C. and filtered through diatomaceous earth. The temperature of the filtrate is maintained at 50° C. and 250 g. of sodium acetate trihydrate is added portionwise. The mixture is cooled to room temperature and filtered through diatomaceous earth. The product is washed on the filter with a 33.3% aqueous solution of sodium acetate trihydrate, followed by ethanol. The product is carefully scraped off the celite, dried, pulverized and boiled with 500 ml. of ethanol. Filtration gives 6-amino-4-hydoxy-5-(4-nitro-2-sulfophenylazo)-2-naphthalenesulfonic acid, disodium salt.

A 27.5 g. portion of the above product is placed in 150 ml. of water maintained at 60°-70° C., 19.4 g. of sodium sulfide nonahydrate is added and the solution is heated on a steam bath for 10 minutes. A 25 ml. portion of acetic acid is added and the mixture is heated for 5 minutes, then filtered through diatomaceous earth. To the filtrate is added 10 g. of sodium hydroxide followed by 50 g. of sodium acetate trihydrate. The mixture is cooled to 20° C. to obtain a crystalline product which requires rapid filtration and is then washed with a 33.3% aqueous solution of sodium acetate trihydrate followed by ethanol. The crystals are then refluxed with 400 ml. of ethanol to provide 6-amino-5-(4-amino-2-sulfophenylazo)-4-hydroxy-2-naphthalenesulfonic acid disodium salt.

To a 350 ml. portion of hexamethylphosphoric triamide, which has been redistilled over calcium hydride, is added 10.2 g. of the preceeding brown powder and 6.0 ml. of pyridine. Solution is obtained by warming and stirring for 1 hour. The solution is then cooled in an ice bath and a solution of 2.28 g. of oxalyl chloride in 20 ml. of dry toluene is added dropwise, over a 30 minute period, with stirring. After stirring for an additional 30 minutes at ambient temperature, 5 ml. of water is added and the solution is heated on a steam bath for 10 minutes. The solution is evaporated in vacuo and the residue stirred overnight in 500 ml. of ethanol. The mixture is filtered and the crude product precipitated from 200 ml. of water solution with 60 g. of sodium acetate trihydrate. This product is filtered and washed with a 23% aqueous solution of sodium acetate trihydrate followed by ethanol. This material is reprecipitated twice more from approximately 100 ml. of aqueous solution with 20 g. of sodium acetate trihydrate each time. The final product is washed with ethanol and dried overnight in vacuo at 80° C. to obtain 3,3'-(oxalyldiimino)bis-[6-(2-amino-8-hydroxy-6-sulfo-1-naphthylazo)-benzenesulfonic acid]tetrasodium salt.

EXAMPLE 2

3,3'-[(6-Morpholino-s-triazin-2,4-diyl)diimino]bis-[6-(2-amino-8-hydroxy-6-sulfo-1-naphthylazo)benzenesulfonic acid]tetrasodium salt A mixture of 5.0 g. of 6-amino-5-(4-amino-2-sulfophenylazo)-4-hydroxy-2-naphthalenesulfonic acid, disodium salt, 922 mg. of cyanuric chaloride and 800 mg. of pyridine in 100 ml. of water is prepared and stirred at 40°-45° C. for 40 hours. A 1.5 ml. portion of morpholine is added and the mixture is refluxed for 4 hours and 15 minutes. An additional 165 ml. of water is added, the mixture is heated to 75° C. and 50 g. of sodium acetate trihydrate is added. The mixture is filtered very slowly and the product is washed with a 20% aqueous solution of sodium acetate trihydrate, followed by ethanol. The residue is dissolved in 200 ml. of water containing 0.85 ml. of 5N sodium hydroxide and filtered through a sintered glass funnel. The filtrate is concentrated to approximately 150 ml., warmed on a steam bath, and 25 g. of sodium acetate trihydrate is added. The mixture is centrifuged and the product is washed with a 20% aqueous solution of sodium acetate trihydrate, followed by ethanol. The resultant dark reddish brown powder is 3,3'-[(6-morpholino-s-triazin-2,4-diyl)diamino]bis-[6-(2-amino-8-hydroxy-6-sulfo-1-naphthylazo)benzenesulfonic acid] tetrasodium salt.

EXAMPLE 3

4,4'-Bis(2-amino-8-hydroxy-6-sulfo-2-naphthylazo)-2,2'-stilbenedisulfonic acid tetrasodium salt To 35 ml. of water at about 35° C. is added 8.0 ml. of 5N sodium hydroxide plus 8.4 g. of approximately 88% 4,4'-diaminostilbene-2,2'-disulfonic acid and 2.76 g. of sodium nitrite. The solution is added to a stirred mixture of 100 ml. of crushed ice, 13.3 ml. of concentrated hydrochloric acid and 20 ml. of acetic acid. This mixture is stirred in an ice bath during preparation of a solution of the sodium salt of 7-amino-1-naphthol-3-sulfonic acid (gamma acid).

To a solution of 11.25 g. of 85% pure 7-amino-1-naphthol-3-sulfonic acid in 20 ml. of water and 8.4 ml. of 5N sodium hydroxide, is added 16.3 g. of sodium acetate trihydrate in 35 ml. of water. The resulting solution is added to the stirred, ice cooled mixture, and stirred for 5 minutes. The mixture is warmed to 85° C., cooled to room temperature and filtered. The product is then washed with a 20% aqueous solution of sodium acetate trihydrate and then with ethanol. The material is reprecipitated twice from aqueous solution with sodium acetate trihydrate and the product is washed with a 10% aqueous solution of sodium acetate trihydrate, followed by ethanol to give 4,4'-bis(2-amino-8-hydroxy-6-sulfo-2-naphthylazo)-2,2'-stilbenedisulfonic acid tetrasodium salt, as a dark brown powder.

EXAMPLE 4

4,4'-Bis(2-amino-8-hydroxy-6-sulfo-1-naphthylazo)-2,2'-biphenyldisulfonic acid tetrasodium salt A 2.76 g. portion of sodium nitrite is added to a filtered solution of 9.83 g. of 70% 4,4'-diamino-2,2'-biphenyldisulfonic acid in 35 ml. of water and 10 ml. of 5N sodium hydroxide. The mixture is warmed on a steam bath until completely dissolved, then the solution is carefully cooled to near room temperature and is poured over a stirred mixture of 150 ml. of crushed ice, 14.2 ml. of concentrated hydrochloric acid and 20 ml. of acetic acid. The resulting clear solution is kept cold in a stirred ice bath during preparation of a solution of the sodium salt of 7-amino-1-naphthol-3-sulfonic acid (gamma acid). To a solution of 11.25 g. of 85% pure 7-amino-1-naphthol-3-sulfonic acid in 20 ml. of water and 8.4 ml. of 5N sodium hydroxide, is added 16.3 g. of sodium acetate trihydrate in 35 ml. of water. The resulting solution is poured into the stirred ice cooled tetraazotized solution, stirred for 10 minutes and is filtered. The product is washed with a 20% aqueous solution of sodium acetate trihydrate and then with ethanol. An additional amount of product is obtained by salting out the filtrate with 50 g. of sodium acetate trihydrate. The total product is dissolved in 200 ml. of water and filtered through diatomaceous earth. A 15 g. portion of sodium acetate trihydrate is added to the filtrate and the mixture is warmed until it is in solution then is allowed to cool to room temperature. The final product is filtered and washed with a 10% aqueous solution of sodium acetate trihydrate and liberal amounts of ethanol to give 4,4'-bis(2-amino-8-hydroxy-6-sulfo-1-naphthylazo)-2,2'-biphenyldisulfonic acid tetrasodium salt.

EXAMPLE 5

5,5'-(Succinyldiimino)bis-[6-(2-amino-8-hydroxy-6-sulfo-1-naphthylazo)benzenesulfonic acid] tetrasodium salt To a 175 ml. portion of hexamethylphosphoric triamide which has been redistilled over calcium hydride is added with stirring a 5.0 g. portion of 6-amino-5-(4-amino-2-sulfophenylazo)-4-hydroxy-2-naphthalenesulfonic acid, disodium salt. The solution is then heated with vigorous stirring for 30 minutes after the addition of 1.5 g. of anhydrous sodium acetate. The mixture is cooled to ambient temperature and 1.0 ml. of succinyl chloride is added over a 1–2 minute period with efficient stirring. The mixture is stirred for 15 minutes then evaporated in vacuo resulting in an oil. The oil is dissolved in 120 ml. of hot water and filtered. To the hot filtrate is added 20 g. of sodium acetate trihydrate, the mixture is cooled to room temperature and filtered at a moderate rate. The product is washed with a 10% aqueous solution of sodium acetate trihydrate followed by ethanol, then dried overnight at 110° C. to give 5,5'-(succinyldiimino)-bis[6-(2-amino-8-hydroxy-6-sulfo-1-naphthlazo)-benzenesulfonic acid] tetrasodium salt.

EXAMPLE 6

5,5'-[Oxybis(2-nitro-p-phenyleneazo)]bis-[6-amino-2-naphthalenesulfonic acid] disodium salt To a solution of 3.26 g. of 4,4'-diamino-3,3'-dinitrodiphenylether in 20 ml. of water, 75 ml. of acetic acid, and 5.6 ml. of concentrated hydrochloric acid cooled in an ice bath, is added a solution of 1.55 g. of sodium nitrite in 3 ml. of water. The mixture is stirred in the ice bath for approximately 15 minutes then a solution of 3.06 g. of sodium acetate trihydrate in 5 ml. of water is added followed by a solution of 5.57 g. of 6-amino-2-naphthalenesulfonic acid in 65 ml. of water and 4.7 ml. of 5N sodium hydroxide. The resulting thick mixture is diluted with 400 ml. of water and 200 ml. of 5N sodium hydroxide to give a granular precipitate which is filtered. The product is washed with a 15% aqueous solution of sodium acetate trihydriate followed by ethanol, then ether, to give a dark brown powder. This material is dissolved in 380 ml. of hot water and filtered through diatomaceous earth. A 70 g. portion of sodium acetate trihydrate is added to the hot filtrate and the mixture is warmed and stirred until the gel-like precipitate becomes granular. The mixture is filtered and the product is washed with ethanol to provide 5,5'-[oxybis(2-nitro-p-phenyleneazo]bis-[6-amino-2-naphthylenesulfonic acid] disodium salt.

EXAMPLE 7

5,5'-[Sulfonylbis-(p-phenyleneazo)]bis-[6-amino-4-hydroxy-2-naphthalenesulfonic acid] disodium salt To a solution of 4.96 g. of 4,4'-diaminodiphenylsulfone in 60 ml. of water, 10 ml. of concentrated hydrochlobath, is added a solution of 2.76 g. of sodium nitrite in 5 ml. of water. The mixture is kept in the ice bath while a solution of 7-amino-1-naphthol-3-sulfonic acid (gamma acid) is prepared. A 9.8 g. portion of 98.3% pure gamma acid is dissolved in 20 ml. of water and 8.6 ml. of 5N sodium hydroxide. This solution is added to the tetraazo solution in the ice bath immediately after adding 12.2 g. of sodium acetate trihydrate to it. The mixture is then stirred for a few minutes, warmed to 80° C., cooled to room temperature and filtered. The product is washed with a 15% aqueous solution of sodium acetate trihydrate then with ethanol and ether to give 5,5'-[sulfonylbis-(p-phenyleneazo)]bis-[6-amino-4-hydroxy-2-naphthalenesulfonic acid] disodium salt as a red powder.

EXAMPLE 8

5,5'-[Oxybis(2-amino-p-phenyleneazo)]bis[6-amino-2-naphthalenesulfonic acid] disodium salt A mixture of 4.0 g. of 5,5'-[oxybis(2-nitro-p-phenyleneazo)]bis-[6-amino-2-naphthalenesulfonic acid] disodium salt and 4.0 g. of sodium sulfide nonahydrate is dissolved in 50 ml. of water by heating on a steam bath for 15 minutes. The solution is cooled and 1.6 ml. of acetic acid is added. The mixture is then filtered through diatomaceous earth. The product is salted out of the filtrate with 25 g. of sodium acetate trihydrate at room temperature, filtered and washed with a small amount of 33% aqueous solution of sodium acetate trihydrate then with ethanol and ether. The product is dissolved in 30 ml. of hot water and filtered through diatomaceous earth. An 18 g. portion of sodium acetate trihydrate is added to the filtrate and this mixture is filtered and the product is washed with ethanol and ether to give 5,5'-[oxybis(2-amino-p-phenyleneazo)]bis-[6-amino-2-naphthalenesulfonic acid] disodium salt.

EXAMPLE 9

Preparation of Compressed Tablet

| | mg./tablet |
|---|---|
| 3,3'-(Oxalyldiimino)bis-[6-(2-amino-8-hydroxy-6-sulfo-1-naphthylazo)benzenesulfonic acid tetrasodium salt | 0.5–500 |
| Dibasic Calcium Phosphate NF | qs |
| Starch USP | 40 |
| Modified Starch | 10 |
| Magnesium Stearate USP | 1–5 |

EXAMPLE 10

Preparation of Compressed Tablet-Sustained Action

| | mg./tablet |
|---|---|
| 3,3'-(Oxalyldiimino)bis-[6-(2-amino-8-hydroxy-6-sulfo-1-naphthylazo)-benzenesulfonic acid tetrasodium salt as Aluminum Lake,* Micronized | 0.5–500 as acid equivalent |
| Dibasic Caldium Phospate NF | qs |
| Alginic Acid | 20 |
| Starch USP | 35 |
| Magnesium Stearate USP | 1–10 |

*Complement inhibitor as sodium salt + Al₂(SO₄)₃ → Al Complement inhibitor + Na₂SO₄. Complement inhibitor content in Aluminum Lake ranges from 5–30%.

EXAMPLE 11

Preparation of Hard Shell Capsule

| | mg./capsule |
|---|---|
| 4,4'-Bis(2-amino-8-hydroxy-6-sulfo-2-naphthylazo)-2,2'-stilbenedisulfonic acid tetrasodium salt | 0.5–500 |
| Lactose, Spray Dried | qs |
| Magnesium Stearate | 1–10 |

EXAMPLE 12

Preparation of Oral Liquid (Syrup)

| | % w/v |
|---|---|
| 4,4'-Bis(2-amino-8-hydroxy-6-sulfo-1-naphthylazo)-2,2'-biphenyldisulfonic acid tetrasodium salt | 0.05–5 |
| Liquid Sugar | 75.0 |
| Methyl Paraben USP | 0.18 |
| Propyl Paraben USP | 0.02 |
| Flavoring Agent | qs |
| Purified Water qs ad | 100.0 |

EXAMPLE 13

Preparation of Oral Liquid (Elixir)

| | % w/v |
|---|---|
| 3,3'-(Oxalyldiimino)bis-[6-(2-amino-8-hydroxy-6-sulfo-1-naphthylazo)-benzenesulfonic acid tetrasodium salt | 0.05–5 |
| Alcohol USP | 12.5 |
| Glycerin USP | 45.0 |
| Syrup USP | 20.0 |
| Flavoring Agent | qs |
| Purified Water qs ad | 100.0 |

EXAMPLE 14

Preparation of Oral Suspension (Syrup)

| | % w/v |
|---|---|
| 4,4-Bis(amino-8-hydroxy-6-sulfo-1-naphthylazo)-2,2'-biphenyldisulfonic acid tetrasodium salt as Aluminum Lake, Micronized | 0.05–5 (acid equivalent) |
| Polysorbate 80 USP | 0.1 |
| Magnesium Aluminum Silicate, Colloidal | 0.3 |
| Flavoring Agent | qs |
| Methyl Paraben USP | 0.18 |
| Propyl paraben USP | 0.02 |
| Liquid Sugar | 75.0 |
| Purified Water qs ad | 100.0 |

EXAMPLE 15

Preparation of Injectable Solution

| | % w/v |
|---|---|
| 3,3'-(Oxalydiimino)bis-[6-(2-amino-8-hydroxy-6-sulfo-1-naphthylazo)-benzenesulfonic acid tetrasodium salt | 0.05–5 |
| Benzyl alcohol N.F. | 0.09 |
| Water for Injection | 100.0 |

EXAMPLE 16

Preparation of Injectable Oil

| | % w/v |
|---|---|
| 4,4'-Bis(2-amino-8-hydroxy-6-sulfo-1-naphthylazo-2,2'-biphenyldisulfonic acid tetrasodium salt | 0.05–5 |
| Benzyl Alcohol | 1.5 |
| Sesame Oil qs ad | 100.0 |

EXAMPLE 17

Preparation of Injectable Depo Suspension

| | % w/v |
|---|---|
| 3,3'-(Oxalyldiimino)bis-[6-(2-amino-8-hydroxy-6-sulfo-1-naphthylazo)-benzenesulfonic acid]tetrasodium salt as Aluminum Lake, Micronized | 0.05–5 (acid equivalent) |
| Polysorbate 80 USP | 0.2 |
| Polyethylene Glycol 4000 USP | 0.2 |
| Polyethylene Glycol 4000 USP | 0.3 |
| Sodium Chloride USP | 0.8 |
| Benzyl Alcohol N.F. | 0.9 |
| HCl to pH 6–8 | qs |

EXAMPLE 17-continued

| Preparation of Injectable Depo Suspension | |
|---|---|
| | % w/v |
| Water for Injection qs ad | 100.0 |

The sulfonic compounds of this invention may be administered internally, e.g., orally or parenterally, e.g., inter-articularly, to a warm-blooded animal to inhibit complement in the body fluid of the animal, such inhibition being useful in the amelioration or prevention of those reactions dependent upon the function of complement, such as inflammatory process and cell membrane damage induced by antigen-antibody complexes. A range of doses may be employed depending on the mode of administration, the condition being treated and the particular sulfonic compound being used. For example, for intravenous or subcutaneous use from about 5 to about 50 mg./kg./day, or every 6 hours for more rapidly excreted salts, may be used. For intra-articular use for large joints such as the knee, from about 2 to about 20 mg./joint per week may be used, with proportionally smaller doses for smaller joints. The dosage range is to be adjusted to provide optimum therapeutic response in the warm-blooded animal being treated. In general, the amount of sulfonic compound administered can vary over a wide range to provide from about 5 mg./kg. to about 100 mg./kg. of body weight of animal per day. The usual daily dosage for a 70 kg. subject may vary from about 350 mg. to about 3.5 g. Unit doses of the acid or salt can contain from about 0.5 mg. to about 500 mg.

In therapeutic use the compounds of this invention may be administered in the form of conventional pharmaceutical compositions. Such compositions may be formulated so as to be suitable for oral or parenteral administration. The active ingredient may be combined in admixture with a pharmaceutically acceptable carrier, which carrier may take a wide variety for forms depending on the form of preparation desired for administration, i.e., oral or parenteral. The compounds can be used in compositions such as tablets. Here, the principal active ingredient is mixed with conventional tabletting ingredients such as corn starch, lactose, sucrose, sorbitol, talc, stearic acid, magnesium stearate, dicalcium phosphate, gums, or similar materials as non-toxic pharmaceutically acceptable diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage, an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating. The tablet or pill may be colored through the use of an appropriate non-toxic dye, so as to provide a pleasing appearance.

The liquid forms in which the novel compositions of the present invention may be incorporated for administration include suitable flavored emulsions with edible oils, such as, cottonseed oil, sesame oil, coconut oil, peanut oil, and the like, as well as elixirs and similar pharmaceutical vehicles. Sterile suspensions or solutions can be prepared for parenteral use. Isotonic preparations containing suitable preservatives are also desirable for injection use.

The term dosage form as described herein refers to physically discrete units suitable as unitary dosage for warm-blooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specification. Examples of suitable oral dosage forms in accord with this invention are tablets, capsules, pills, powders packets, granules, wafers, cachets, teaspoonfuls, dropperfuls, ampules, vials, segregated multiples of any of the foregoing and other forms as herein described.

The complement inhibiting activity of the compounds of this invention has been demonstrated by one or more of the following identified tests: (i) Test, Code 026 (C1 inhibitor). This test measures the ability of activated human C1 to destroy fluid phase human C2 in the presence of C4 and appropriate dilutions of the test compound. An active inhibitor protects C2 from C1 and C4; (ii) Test, Code 035 (C3-C9 inhibitor) — This test determines the ability of the late components of human complement (C3-C9) to lyse EAC 142 in the presence of appropriate dilutions of the test compound. An active inhibitor protects EAC 142 from lysis by human C3-C9; (iii) Test, Code 036 (C-Shunt inhibitor) — In this test human erythrocytes rendered fragile are lysed in autologous serum via the shunt pathway activated by cobra venom factor in the presence of appropriate dilutions of the test compound. Inhibition of the shunt pathway results in failure of lysis; (iv) Forssman Vasculitis Test — Here, the well known complement dependent lesion, Forssman vasculitis, is produced in guinea pigs by intradermal injection of rabbit anti-Forssman antiserum. The lesion is measured in terms of diameter, edema and hemorrhage and the extent to which a combined index of these is inhibited by prior intraperitoneal injection of the test compound at 200 mg./kg. is then reported, unless otherwise states; (v) Forssman Shock Test — Lethal shock is produced in guinea pigs by an i.v. injection of anti-Forssman antiserum and the harmonic mean death time of treated guinea pigs is compared with that of simultaneous controls; (vi) Complement Level Reduction Test — In this test, the above dosed guinea pigs, or others, are bled for serum and the complement level is determined in undiluted serum by the capillary tube method of U.S. Pat. No. 3,876,376 and compared to undosed control guinea pigs; and (vii) Cap 50 Test — Here, appropriate amounts of the test compound are added to a pool of guinea pig serum in vitro, after which the undiluted serum capillary tube assay referred to above is run. The concentration of compound inhibiting 50% is reported.

Table I shows that the compounds of the invention process highly significant in situ and in vivo complement inhibitory activity in warm-blooded animals.

TABLE I

| Compound | Biological Activities Assay Results | | | |
|---|---|---|---|---|
| | In Vitro | | In Vivo | |
| | 026* | 035 | Forssman | % Reduction Complement |
| 3,3'-ureylenebis[6-(2-amino-8-hydroxy-6-sulfo-1-naphthylazo)-benzenesulfonic acid]tetrasodium salt | +2** | +6 | 66 | 97 |
| 5,5'-(succinyldiimino)bis-[6-(2-amino-8-hydroxy-6-sulfo-1-naphthylazo)benzenesulfonic acid] tetrasodium salt | +4 | +4 | Neg. | — |
| 3,3'-(oxalyldiimino)bis-[6-(2-amino-8-hydroxy-6-sulfo-1-naphthylazo) benzenesulfonic acid]tetrasodium salt | +7 | +3 | 60 | 83 |
| 3,3'-[(6-morpholino-s-triazin-2,4-diyl)diamino]bis-[6-(2-amino-8-hydroxy-6-sulfo-1-naphthylazo)benzenesulfonic acid]tetrasodium salt | +2 | +4 | 49 | 58 |
| 4,4'-bis(2-amino-8-hydroxy-6-sulfo-1-naphthylazo)-2,2'-biphenyldisulfonic acid tetrasodium salt | +3 | +6 | 58 / 73 | 72 / 91 |
| 4,4'-bis(2-amino-8-hydroxy-6-sulfo-2-naphthylazo)-2,2'-stilbenedisulfonic acid tetra sodium salt | +2 | +6 | 53 | 85 |
| 5,5'-[oxybis(2-amino-p-phenyleneazo)]bis-[6-amino-2-naphthalenesulfonic acid] disodium salt | Neg. | +1 | Neg. | — |
| 5,5'-[oxybis(2-nitro-p-phenyleneazo)]bis-[6-amino-2-naphthalenesulfonic acid] disodium salt | +1 | +2 | Neg. | — |
| 5,5'-[sulfonylbis-(p-phenyleneazo)]-bis-[6-amino-4-hydroxy-2-naphthalenesulfonic acid] disodium salt | +2 | +3 | Neg. | — |

*Tests identified by code herein.
**2 = Activity 2 wells, a serial dilution assay; higher well number indicates higher activity. The serial dilutions are two-fold.

We claim:
1. 4,4'-bis(2-amino-8-hydroxy-6-sulfo-2-naphthylazo)-2,2'-stilbenedisulfonic acid tetrasodium salt.
2. 5,5'-[oxybis-(2-amino-p-phenyleneazo)]bis-[6-amino-2-naphthalenesulfonic acid] disodium salt.
3. 5,5'-[oxybis-(2-nitro-p-phenyleneazo)]bis-]6-amino-2-naphthalenesulfonic acid] disodium salt.

* * * * *